(12) United States Patent
Sakai et al.

(10) Patent No.: US 8,931,585 B2
(45) Date of Patent: Jan. 13, 2015

(54) BULLDOZER

(71) Applicant: Komatsu Ltd., Tokyo (JP)

(72) Inventors: Kiyotaka Sakai, Komatsu (JP); Taisuke Mizuno, Hakusan (JP); Hirokazu Asaka, Kaga (JP)

(73) Assignee: Komatsu Ltd., Tokyo (JP)

( * ) Notice: Subject to any disclaimer, the term of this patent is extended or adjusted under 35 U.S.C. 154(b) by 58 days.

(21) Appl. No.: 13/713,905

(22) Filed: Dec. 13, 2012

(65) Prior Publication Data
US 2013/0277129 A1 Oct. 24, 2013

(30) Foreign Application Priority Data

Apr. 24, 2012 (JP) ................................. 2012-098568

(51) Int. Cl.
*B60K 5/00* (2006.01)
*E02F 9/08* (2006.01)
*B62D 25/08* (2006.01)
*E02F 3/76* (2006.01)

(52) U.S. Cl.
CPC ............. *E02F 9/0866* (2013.01); *E02F 9/0891* (2013.01); *B62D 25/082* (2013.01); *E02F 3/7609* (2013.01)
USPC ....................................................... 180/291

(58) Field of Classification Search
USPC ............ 180/9.1, 58, 291, 296, 300, 309, 68.3
See application file for complete search history.

(56) References Cited

U.S. PATENT DOCUMENTS

| 3,232,368 | A | * | 2/1966 | Sullivan | 180/68.3 |
| 3,357,163 | A | * | 12/1967 | Burger et al. | 55/385.3 |
| 3,737,002 | A | * | 6/1973 | Yotsumoto | 180/68.3 |
| 3,773,132 | A | * | 11/1973 | Gawlik et al. | 180/291 |
| 3,776,354 | A | * | 12/1973 | Duclo et al. | 180/296 |
| 3,933,216 | A | * | 1/1976 | Irwin | 180/309 |
| 4,013,137 | A | * | 3/1977 | Petersen | 180/68.3 |
| 4,071,009 | A | * | 1/1978 | Kraina | 123/198 E |
| 4,421,195 | A | * | 12/1983 | Aiba | 180/228 |
| 4,454,926 | A | * | 6/1984 | Akins | 180/68.1 |

(Continued)

FOREIGN PATENT DOCUMENTS

| CN | 102032314 A | 4/2011 |
| JP | 6-207420 A | 7/1994 |

(Continued)

OTHER PUBLICATIONS

The Chinese Office Action for the corresponding Chinese application No. 20121056727.X, issued on Jan. 30, 2014.

*Primary Examiner* — Katy M Ebner
*Assistant Examiner* — Brodie Follman
(74) *Attorney, Agent, or Firm* — Global IP Counselors, LLP (57) ABSTRACT

The cab is situated on the body frame. The engine cover is situated in front of the cab. The engine includes the crankshaft extending in the longitudinal direction of the bulldozer. The air cleaner is situated above the engine. The air cleaner is secured to the engine cover. The duct connects the air cleaner and the engine. The duct includes the first connector and the second connector. The first connector is connected to the engine. The second connector is connected to the air cleaner. The front mounting part supports the engine on the body frame. The rear mounting part supports the engine on the body frame. The rear mounting part is situated behind and above the front mounting part.

5 Claims, 9 Drawing Sheets

(56) References Cited

U.S. PATENT DOCUMENTS

| | | | |
|---|---|---|---|
| 4,467,992 A * | 8/1984 | Morimura et al. | 248/659 |
| 4,689,060 A * | 8/1987 | Koske | 55/385.3 |
| 5,273,261 A * | 12/1993 | Hamberg et al. | 267/140.12 |
| 6,655,486 B2 * | 12/2003 | Oshikawa et al. | 180/68.1 |
| 6,739,923 B2 * | 5/2004 | Murakami | 440/111 |
| 7,413,050 B2 * | 8/2008 | Miyagawa et al. | 180/291 |
| 8,403,096 B2 * | 3/2013 | Taguchi et al. | 180/291 |
| 8,469,136 B2 * | 6/2013 | Manabe et al. | 180/291 |
| 8,505,661 B2 * | 8/2013 | Tsuji et al. | 180/68.4 |
| 2002/0017408 A1 * | 2/2002 | Oshikawa et al. | 180/69.2 |
| 2002/0175455 A1 * | 11/2002 | Tousi et al. | 267/140.3 |
| 2003/0066209 A1 * | 4/2003 | Takezaki et al. | 37/197 |
| 2003/0129894 A1 * | 7/2003 | Murakami | 440/111 |
| 2003/0155480 A1 * | 8/2003 | Cholinski et al. | 248/646 |
| 2004/0046450 A1 * | 3/2004 | Yoshida et al. | 307/10.1 |
| 2004/0195033 A1 * | 10/2004 | Kim | 180/291 |
| 2004/0200649 A1 * | 10/2004 | Yatsuda et al. | 180/69.2 |
| 2006/0157292 A1 * | 7/2006 | Miyagawa et al. | 180/312 |
| 2008/0078917 A1 * | 4/2008 | Roehrl et al. | 248/555 |
| 2011/0011665 A1 * | 1/2011 | Peterson et al. | 180/309 |
| 2011/0073402 A1 * | 3/2011 | Manabe et al. | 180/291 |
| 2011/0284306 A1 * | 11/2011 | Ibe et al. | 180/291 |
| 2012/0138379 A1 * | 6/2012 | Tsuji et al. | 180/309 |
| 2012/0247861 A1 * | 10/2012 | Mizuno et al. | 180/296 |

FOREIGN PATENT DOCUMENTS

| | | |
|---|---|---|
| JP | 2002-21565 A | 1/2002 |
| JP | 2002-70067 A | 3/2002 |
| JP | 2003-3517 A | 1/2003 |
| JP | 2006-89967 A | 4/2006 |
| JP | 2007-32108 A | 2/2007 |
| JP | 2007-100365 A | 4/2007 |
| JP | 2009-19348 A | 1/2009 |
| JP | 2009-113744 A | 5/2009 |
| JP | 2012-17552 A | 1/2012 |
| WO | WO-2010/004805 A1 | 1/2010 |

* cited by examiner

BULLDOZER

CROSS-REFERENCE TO RELATED APPLICATIONS

This application claims priority under 35 U.S.C. §119 to Japanese Patent Application No. 2012-098568, filed on Apr. 24, 2012. The entire disclosure of Japanese Patent Application No. 2012-098568 is hereby incorporated herein by reference.

BACKGROUND

1. Field of the Invention

The present invention relates to a bulldozer.

2. Background Information

Bulldozers are equipped with a cab, engine cover and engine. The engine cover is situated in front of the cab. The engine is situated inside the engine cover. Additionally, an air cleaner is connected to the engine by a duct. For example, a bulldozer with an air cleaner situated above the engine is disclosed in Japan Laid-open Patent Application Publication No. JP-A-2002-21565.

SUMMARY

For stable support of an air cleaner, it is preferred that the air cleaner be mounted on the engine cover. However, in this case, depending on the difference between the vibration transmitted to the duct from the engine and the vibration transmitted to the duct from the air cleaner, there is a load on the duct. In particular, since the engine is supported with a mounting part, the amount of vibration transmitted to the duct from the engine increases as the distance between the mounting part and the duct increases. As a result, as the load increases on the connecting part between the engine and the duct or the connecting part between the air cleaner and the duct, the life of the parts around these connecting parts may be shortened.

An object of the present invention is to provide a bulldozer capable of reducing the load from vibration to the duct connected to the air cleaner.

In the embodiment of the present invention, the bulldozer is equipped with a body frame, cab, engine cover, engine, air cleaner, duct, front mounting part, and rear mounting part. The cab is situated on the body frame. The engine cover is situated in front of the cab. The engine is situated on the body frame inside the engine cover. The engine includes the crank shaft extending in the longitudinal direction of the bulldozer. The air cleaner is situated above the engine. The air cleaner is secured to the engine cover. The duct connects the air cleaner and the engine. The duct includes a first connector and a second connector. The first connector is connected to the engine. The second connector is connected to the air cleaner. The front mounting part supports the engine on the body frame. The rear mounting part supports the engine on the body frame. The rear mounting part is situated behind and above the front mounting part.

In the embodiment of the present invention, the rear mounting part is situated higher than the front mounting part. Thus, compared to a case that the rear mounting part is situated at the same height as the front mounting part, the vertical distance between the duct and the rear mounting part is short. Therefore, the load on the duct from vibration can be reduced.

DETAILED DESCRIPTION OF THE EMBODIMENTS

Figure 1:
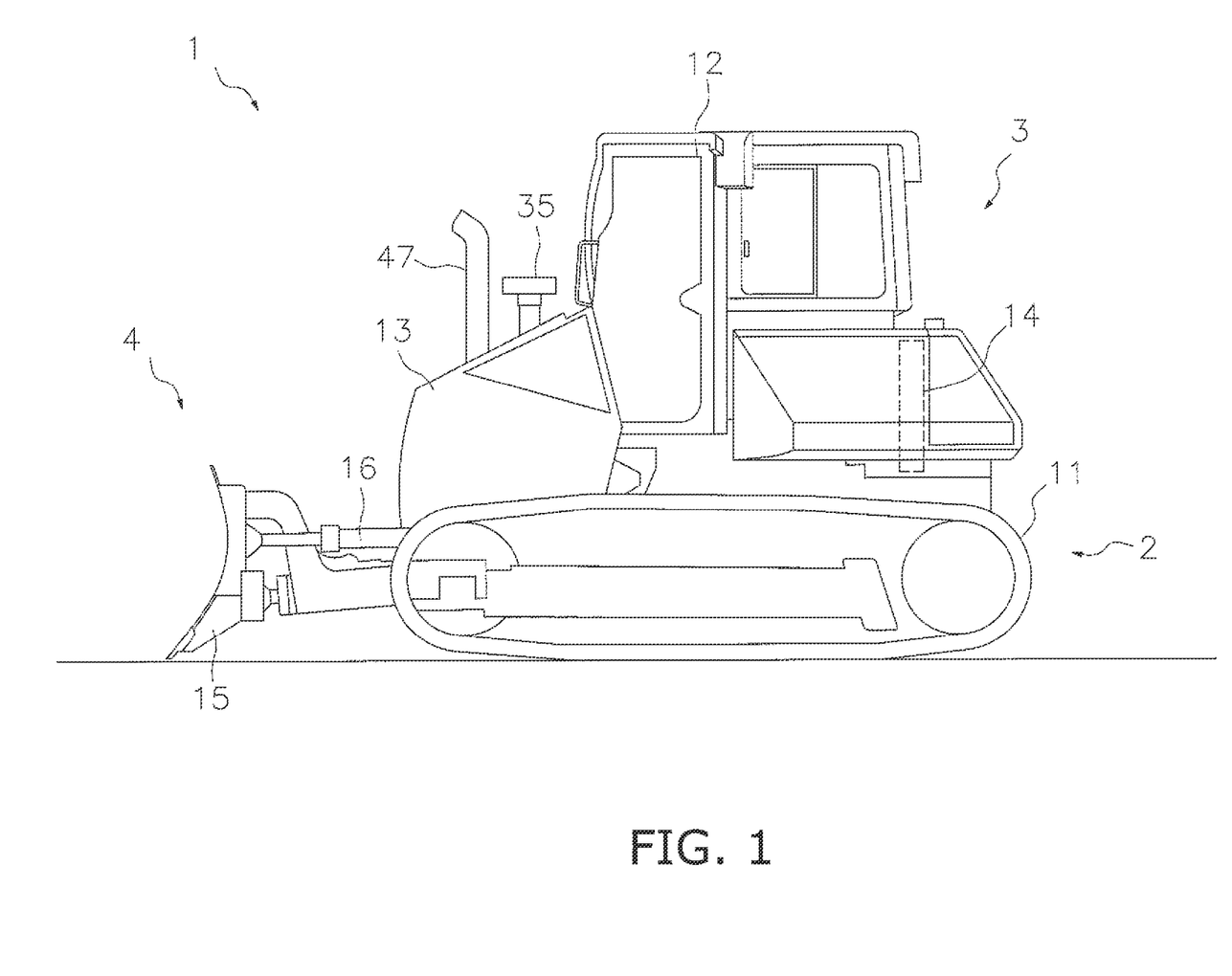
FIG. 1 is aside view of a bulldozer relating to an embodiment of the present invention.

The side view of bulldozer 1 relating to the embodiment of the present invention is shown in FIG. 1. This bulldozer 1 is equipped with a traveling device 2, a vehicle body 3 and a work implement 4. The traveling device 2 is a device that runs the bulldozer and has crawler belts 11. The bulldozer 1 runs when the crawler belts 11 are driven.

The vehicle body 3 includes a body frame 10 (refer to FIG. 2 and FIG. 5), a cab 12, an engine cover 13 and a cooling device 14. The engine cover 13 is situated in front of the cab 12. An engine 5 described later is in the engine cover 13. The top surface of the engine cover 13 is inclined towards the front and downward. The cooling device 14 is situated behind the cab 12. In general, cooling devices are situated in front of the engine inside the engine cover in front of cabs in bulldozers. The cooling device 14 includes, for example, a radiator to cool a cooling fluid of the engine 5 and an oil cooler to cool an operating fluid.

The work implement 4 is disposed in front of the engine cover 13. The work implement 4 has a blade 15 and hydraulic cylinders 16. The blade 15 is installed to pivot vertically. The hydraulic cylinders 16 change the position of the blade 15.

Figure 2:
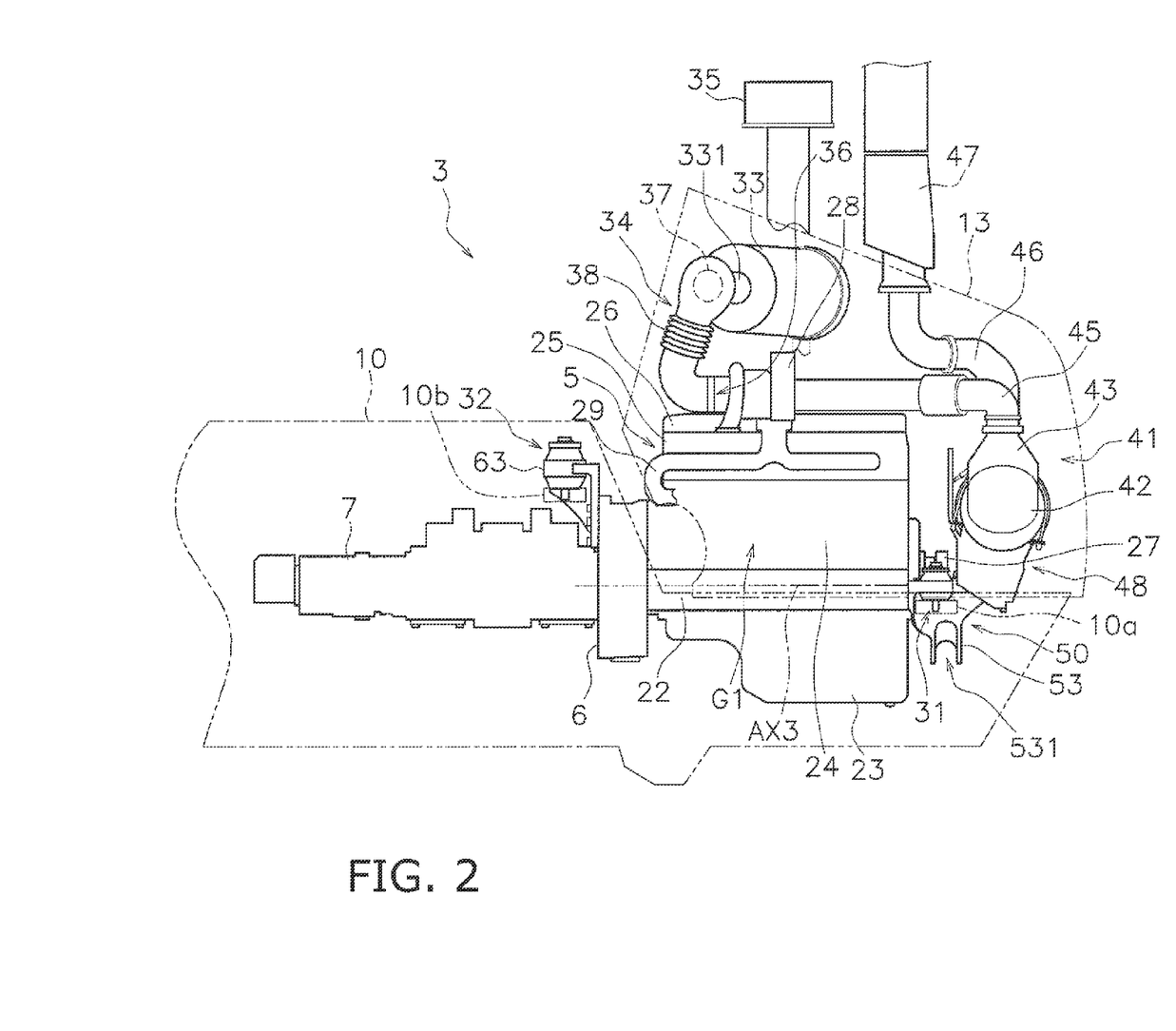
FIG. 2 is a side view showing the configuration inside an engine cover of the bulldozer.
Figure 3:
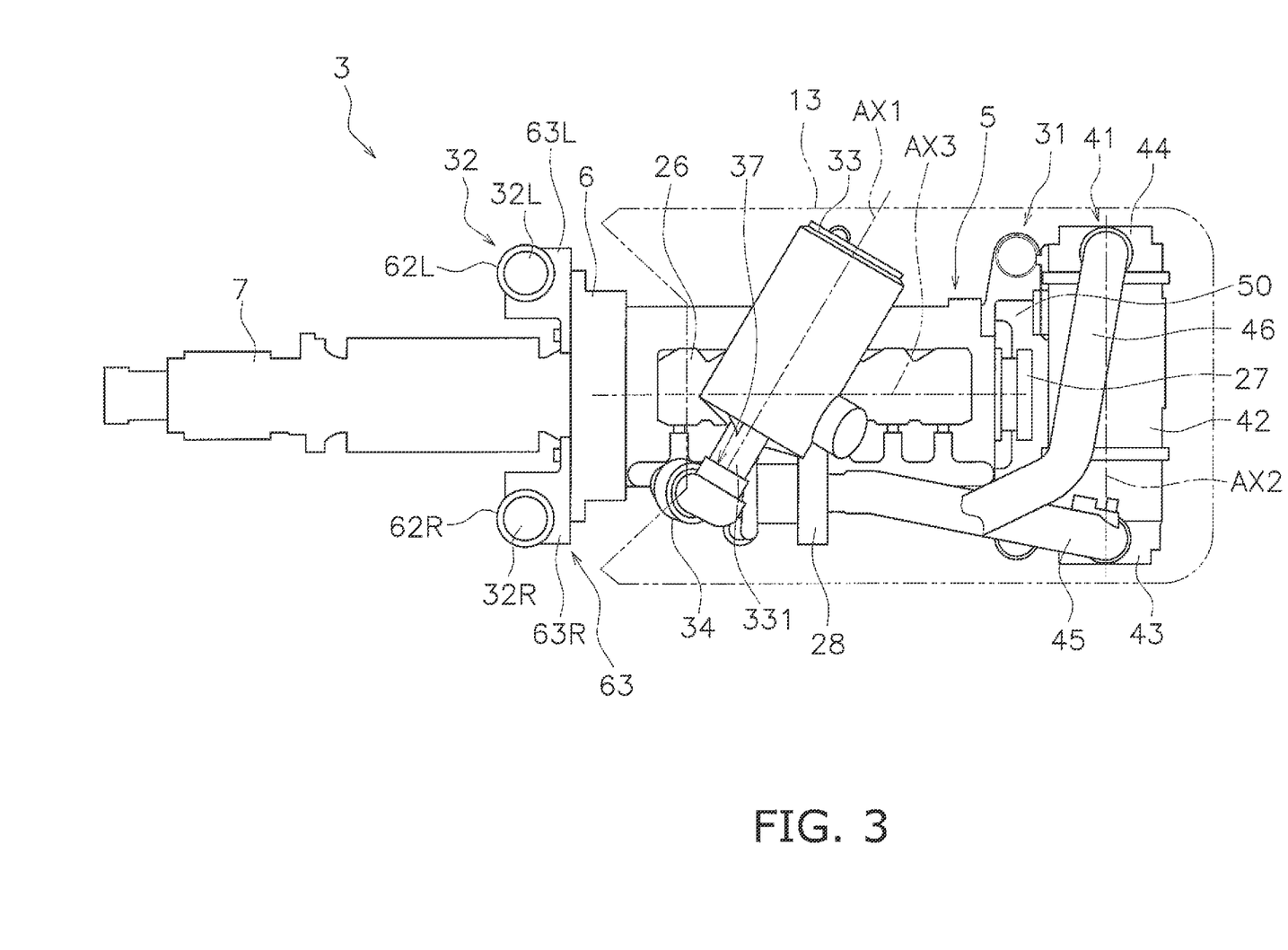
FIG. 3 is a plane view showing the configuration inside the engine cover.
Figure 4:
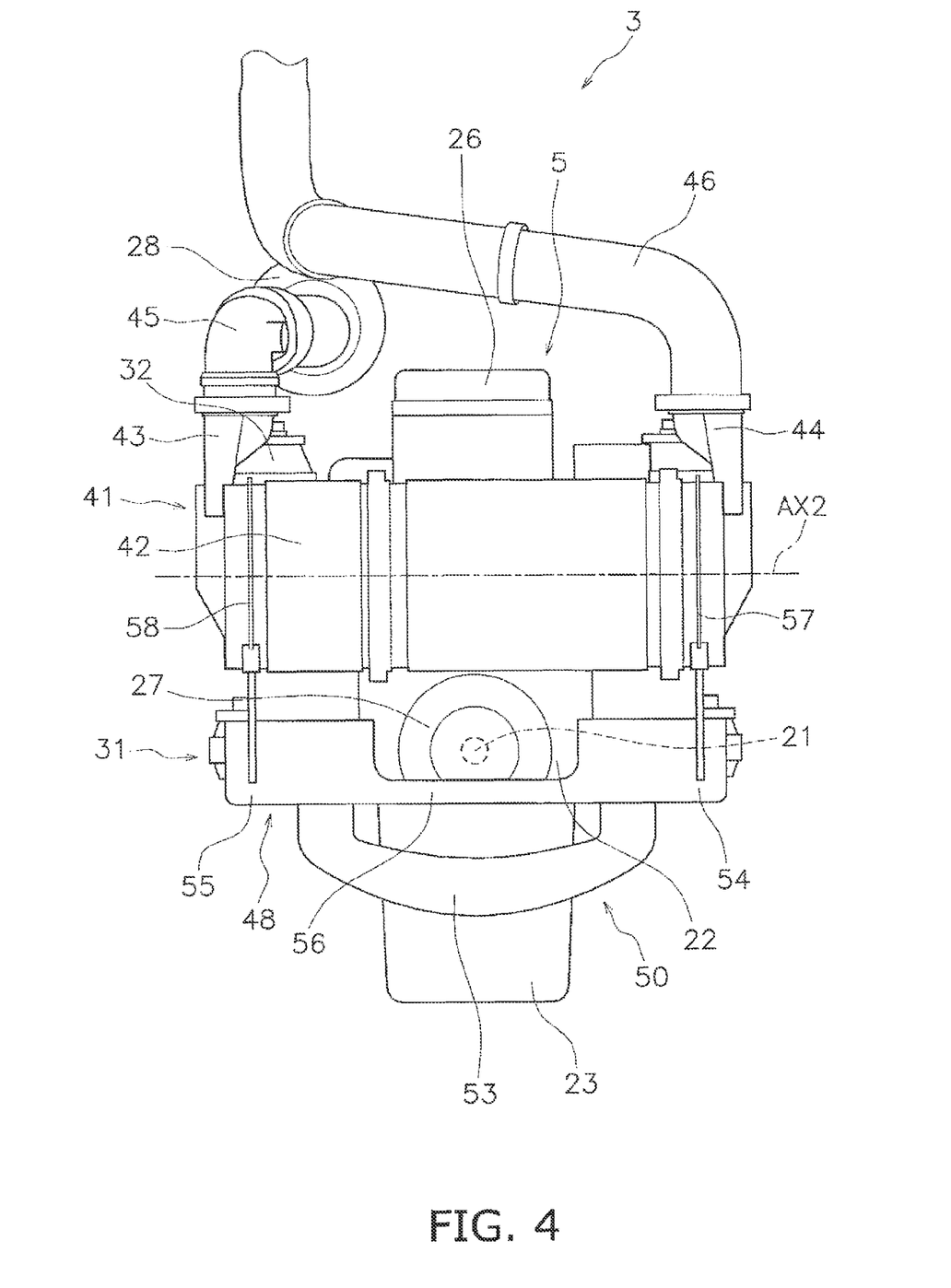
FIG. 4 is a front view showing the configuration inside the engine cover.

FIG. 2 is a side view showing the configuration inside the engine cover. In FIG. 2, the right side shows the front of the bulldozer 1. FIG. 3 is a plane view showing the configuration inside the engine cover 13. FIG. 4 is a front view showing the configuration inside the engine cover 13. For easier understanding, the engine cover 13 is omitted in FIG. 4. Furthermore, in FIGS. 2 to 4, a part of the configuration in the engine cover 13 is omitted. As shown in FIGS. 2 to 4, the vehicle body 3 includes the engine 5, a flywheel housing 6 and a hydraulic pump 7. The engine 5, the flywheel housing 6 and the hydraulic pump 7 are situated inside the engine cover 13.

The engine 5 is, for example a diesel engine, where the output of the engine 5 is controlled by regulating the amount of fuel injected from the fuel injector pump (not shown in the figures). Regulation of the fuel injection amount is conducted by a governor not shown in the figures. An all speed control type governor is used as the governor, where the governor regulates the engine rotation speed and the fuel injection amount according to the load so the actual engine rotation speed reaches the set engine rotation speed command value. Thus, the governor adjusts the amount of fuel injection to reduce the differential between the engine rotation speed command value and the actual engine rotation speed.

The engine 5 includes a crank case 22, an oil pan 23, a cylinder body 24, a cylinder head 25 and a cylinder head cover 26. Also, as shown in FIG. 4, the engine 5 includes a crank shaft 21. The crank shaft 21 extends in the longitudinal direction of the bulldozer 1. In other words, the engine 5 is a so-called longitudinal engine, situated with the long side in the longitudinal direction of the bulldozer 1 and the short side in the direction of the width of the bulldozer 1. Situated in this manner enables the width of the bulldozer to be reduced, which allows visibility to the left and right lower ends of the blade 15 that is required for bulldozers. In FIG. 2, Ax3 shows the line for the central axis of the crank shaft 21. The crank case 22 houses the crank shaft 21. A cam pulley 27 is situated in front of the crank case 22. The crank shaft 21 is connected to the cam pulley 27. The oil pan 23 is situated under the crank case 22. The cylinder body 24 is situated on the crank case 22. The cylinder body 24 and the crank case 22 are integrally formed as a unit. The cylinder head 25 is situated on the cylinder body 24. The cylinder head cover 26 is situated on the cylinder head 25.

Additionally, the engine 5 includes a supercharger 28. The supercharger 28 is connected to the cylinder head 25 with the exhaust pipe 29 of the engine 5. In the plane view of the bulldozer 1, the supercharger 28 is situated to the side of the cylinder head 25. In the side view of the bulldozer 1, at least one part of the supercharger 28 is situated higher than the top surface of the engine 5, specifically, the top surface of the cylinder head cover 26.

The flywheel housing 6 is situated behind the engine 5. The hydraulic pump 7 is situated behind the flywheel housing 6 and attached to the flywheel housing 6. The hydraulic pump 7 is connected to the output shaft of the engine 5 via the flywheel housing 6. The hydraulic pump 7 pumps operating oil driven by the drive force from the engine 5.

Additionally, the vehicle body 3 includes a front mounting part 31 and a rear mounting part 32. The front mounting part 31 and the rear mounting part 32 are situated inside the engine cover 13. The front mounting part 31 and the rear mounting part 32 support the engine 5 on the body frame 10. The front mounting part 31 is supported by a front mount support part 10a of the body frame 10. The rear mounting part 32 is supported by a rear mount support part 10b of the body frame 10. The rear mounting part 32 is situated rearward of the front mounting part 31. The front mounting part and the back mounting part 32 are discussed in detail later.

The vehicle body 3 includes an air cleaner 33 and a duct 34. The air cleaner 33 and the duct 34 are situated inside the engine cover 13. The air cleaner 33 is situated above the engine 5. The air cleaner 33 is secured to the engine cover 13. To be more specific, the air cleaner 33 is secured to the engine cover 13 in a hanging position from the top of the engine cover 13 with a bracket not shown in the figures. The air cleaner 33 has a cylindrical shape. The line of the central axis Ax1 for the air cleaner 33 shown in FIG. 3 is nearly horizontal. The line of the central axis Ax1 for the air cleaner 33 is inclined in the longitudinal direction of the bulldozer 1. Additionally, the line of the central axis Ax1 for the air cleaner 33 is inclined in the direction of the width direction of the bulldozer 1. To be more specific, the line of the central axis Ax1 for the air cleaner 33 extends at an incline to the rear right. The air cleaner 33 includes an inlet (not shown in the figures) and an outlet 331. The inlet is connected to a head part 35 via piping material not shown in the figure. The head part 35 protrudes upwards from the top surface of the engine cover 13. The outlet 331 is installed on the side of the air cleaner 33. The outlet 331 is positioned higher than the aforementioned supercharger 28.

The duct 34 is connected to the air cleaner 33 and the engine 5. The duct 34 extends down from the outlet 331 of the air cleaner 33 and has a shape bent towards the supercharger 28. As shown in FIG. 2, the duct 34 includes a first connector 36, a second connector 37 and a shock absorbing part 38. The first connector 36 is connected to the engine 5. To be more specific, the first connector 36 is connected to the supercharger 28. The second connector 37 is connected to the air cleaner 33. The second connector 37 is connected to the outlet 331 of the air cleaner 33. The shock absorbing part 38 is positioned between the first connector 36 and the second connector 37 in the duct 34. The shock absorbing part 38 has a bellows shape.

The vehicle body 3 includes an exhaust emission control device 41 and a front mounting bracket 50. The exhaust emission control device 41 is a device that purifies the exhaust from the engine 5. The exhaust emission control device 41 is for example, a diesel particulate filter. Alternatively, the exhaust emission control device 41 can also be another device such as that for SCR (Selective Catalytic Reduction). As shown in FIGS. 3 and 4, the exhaust emission control device 41 includes a main body pipe part 42, a first connecting pipe part 43 and a second connecting pipe part 44. The main body pipe part 42 houses parts such as a filter or a catalytic agent, and the exhaust from the engine 5 is purified inside the main body pipe part 42. The first connecting pipe part 43 and the second connecting pipe part 44 are connected to the main body pipe part 42. The first connecting pipe part 43 is situated to protrude upwards from the main body pipe part 42. The first connecting pipe part 43 is connected to one of the sides of the main body pipe part 42. The first connecting pipe part 43 is connected to the previously mentioned supercharger 28 via the first piping material 45. The second connecting pipe part 44 is situated to protrude upwards from the main body pipe part 42. The second connecting pipe part 44 is connected to the other side of the main body pipe part 42. The second connecting pipe part 44 is connected to the exhaust pipe 47 via the second piping material 46. As shown in FIG. 2, the exhaust pipe 47 is situated to protrude upwards from the engine cover 13.

In the plane view of the bulldozer 1, the main body pipe part 42 of the exhaust emission control device 41 is situated in a position in the farthest front inside the engine cover 13 in front of the engine 5. At least a portion of the main body pipe part 42 is situated to overlap with the engine 5 in the front view of the bulldozer 1. This positioning is possible because the cooling device 14 is situated behind the cab 12 instead of inside the engine cover 13. The main body pipe part 42 is situated between the front surface of the engine 5 and the front surface of the engine cover 13. The main body pipe part 42 has a cylindrical shape. The longer direction of the main body pipe part 42 is parallel to the widthwise direction of the bulldozer 1. Additionally, the line of the central axis Ax2 for the main body pipe part 42 is parallel to the widthwise direction of the bulldozer 1. The widthwise dimensions of the main body pipe part 42 are larger than the widthwise dimensions of the engine 5. The main body pipe part 42 is situated lower than the top surface of the cylinder head cover 26. The main body pipe part 42 is situated higher than the bottom surface of the oil pan 23.

The exhaust emission control device 41 is mounted on the front mounting bracket 50, and is supported by the engine 5 via the front mounting bracket 50. Specifically, the exhaust emission control device 41 includes a pipe bracket 48 mounted on the main body pipe part 42. The pipe bracket 48 is mounted to the front mounting bracket 50, and the main body pipe part 42 is supported by the engine 5 via the pipe bracket 48 and the front mounting bracket 50.

Figure 5:
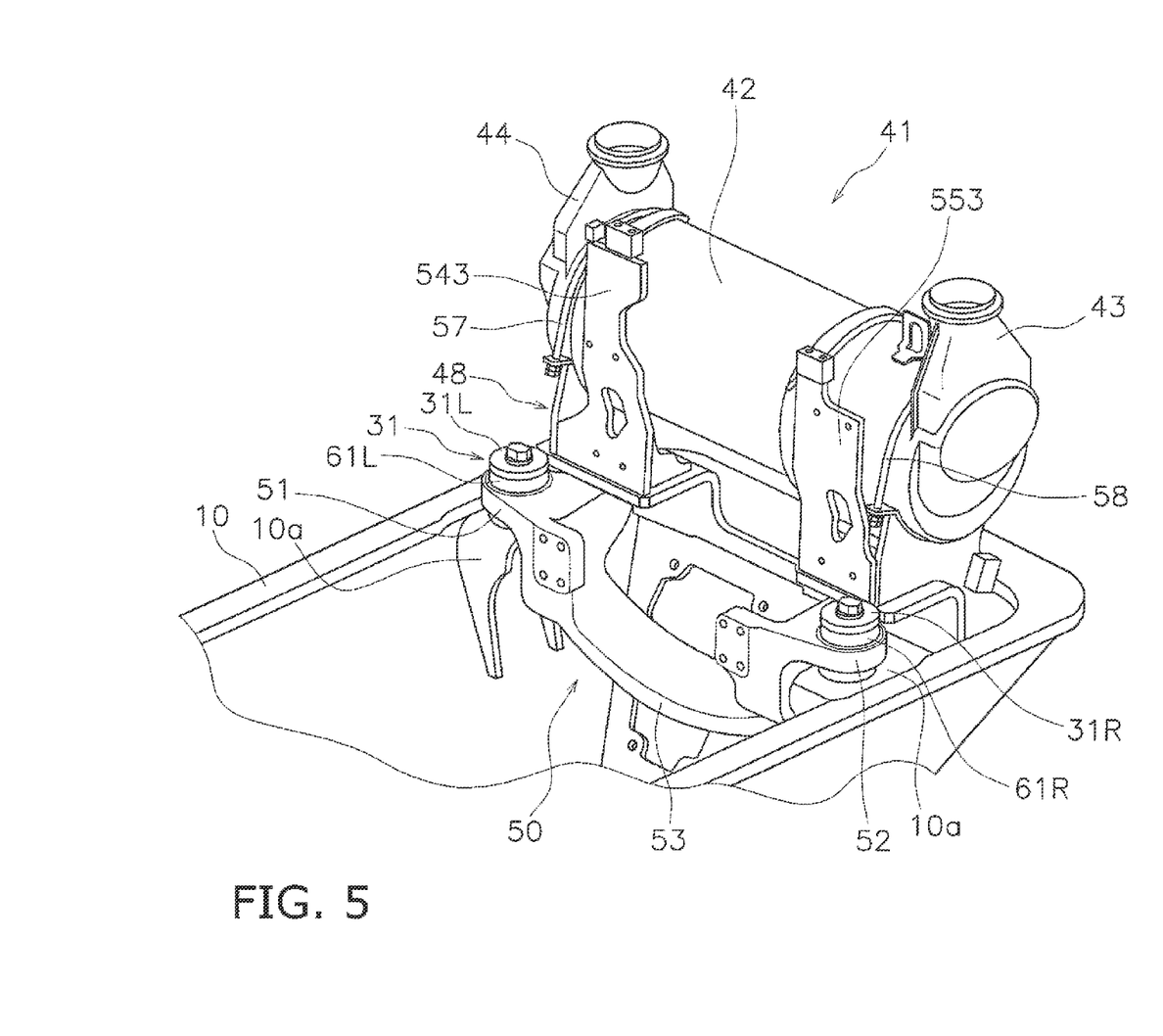
FIG. 5 is a perspective view showing an exhaust emission control device and a front mounting bracket inside the engine cover.
Figure 6:
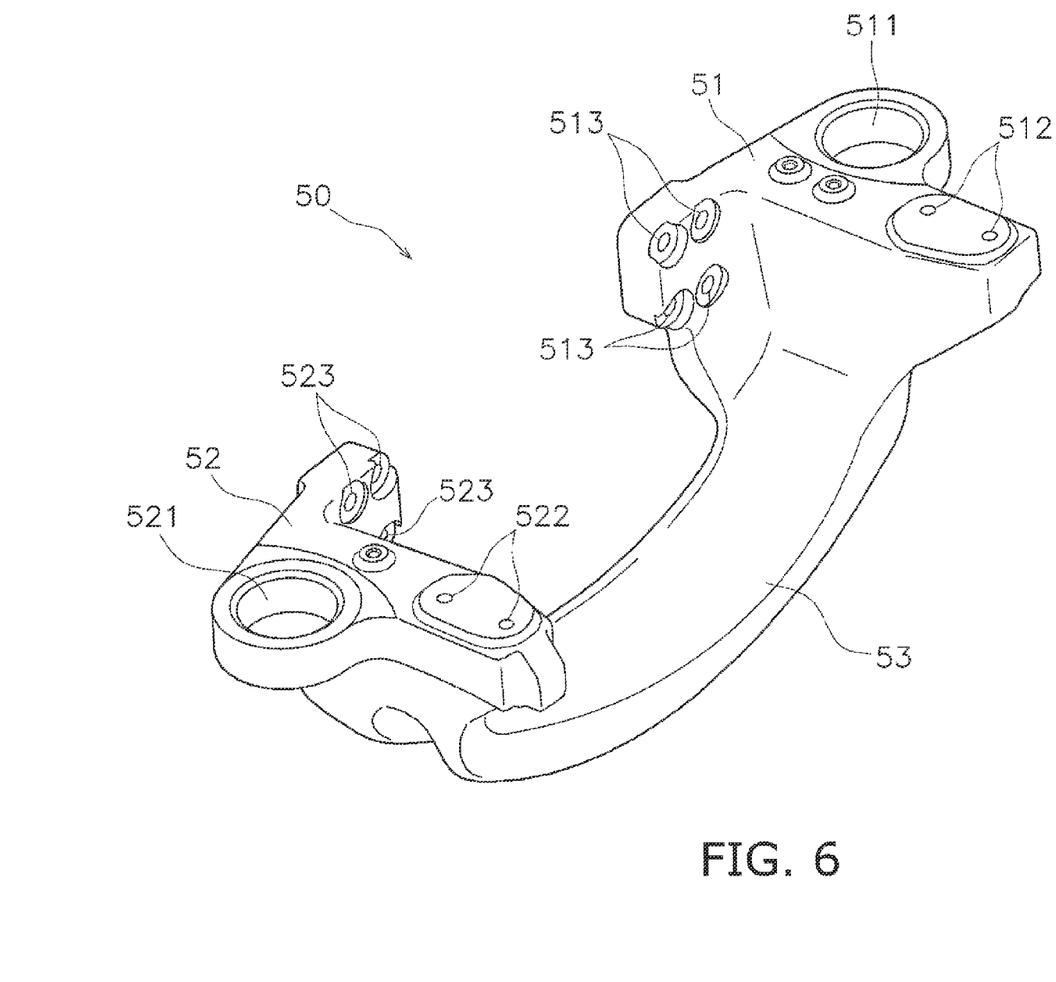
FIG. 6 is a perspective view of the front mounting bracket.
Figure 7:
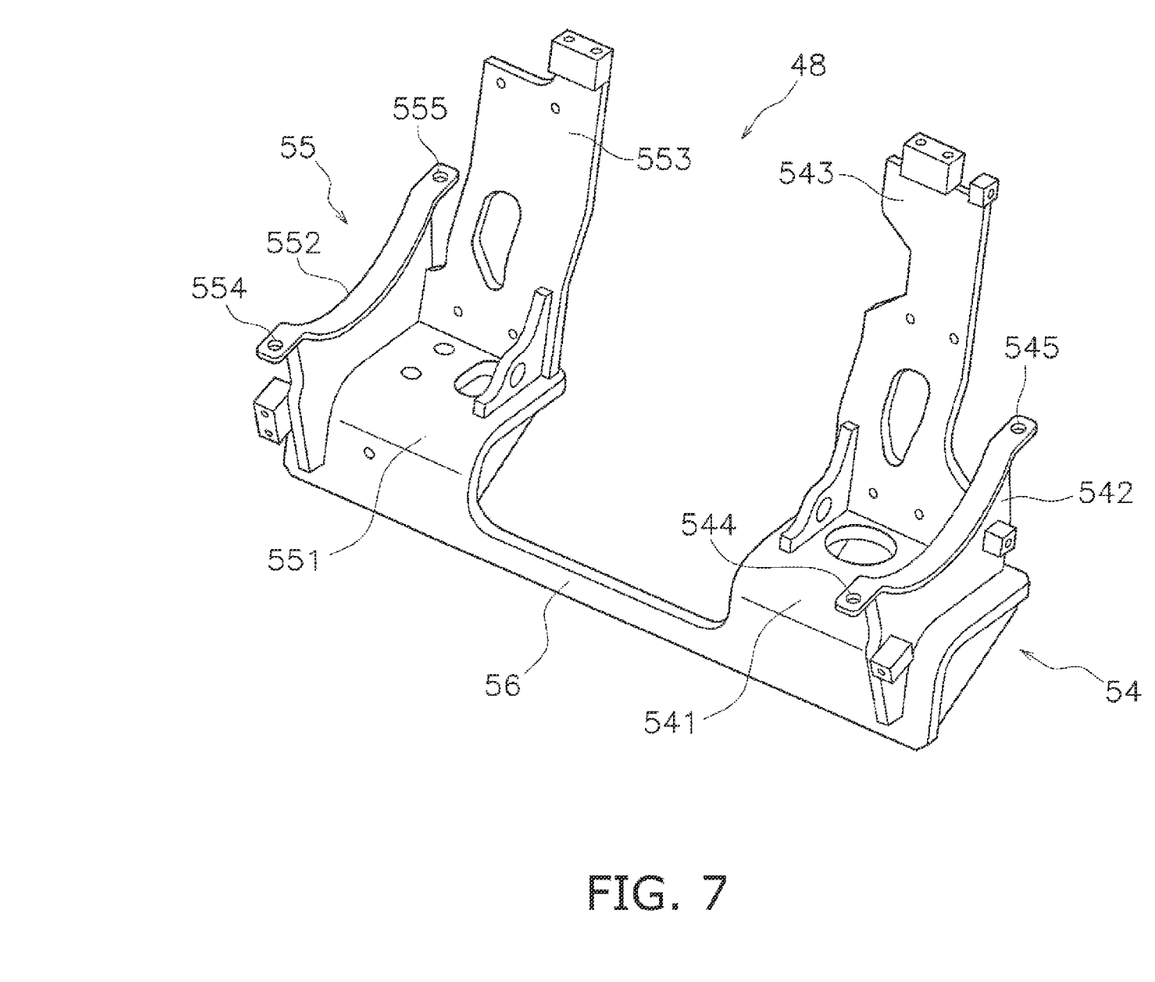
FIG. 7 is a perspective view of a pipe bracket.

FIG. 5 is a perspective view showing the exhaust emission control device 41 and the front mounting bracket 50. FIG. 6 is a perspective view of the front mounting bracket 50. FIG. 7 is a perspective view of the pipe bracket 48. As shown in FIG. 5, the front mounting bracket 50 is mounted on the body frame 10 via the front mounting part 31. The front mounting bracket 50 is mounted on the engine 5. Additionally, the engine 5 is supported by the front mounting part 31 via the front mounting bracket 50. The front mounting part 31 includes a left front mounting part 31L and a right front mounting part 31R. The left front mounting part 31L and the right front mounting part 31R are positioned separated each other in the widthwise direction of the bulldozer 1.

As shown in FIG. 6, the front mounting bracket 50 includes a left bracket part 51, a right bracket part 52 and a connector 53. The left front mounting part 31L is mounted on the left bracket part 51. To be more specific, the left bracket part 51 includes a left mounting opening 511. The left mounting opening 511 penetrates through the left bracket part 51 in the vertical direction. The left front mounting part 31L is inserted into the left mounting opening 511. The right front mounting part 31R is mounted on the right bracket part 52. To be more specific, the right bracket part 52 includes a right mounting opening 521. The right mounting opening 521 penetrates through the right bracket part 52 in the vertical direction. The right front mounting part 31R is inserted into the right mounting opening 521.

The left bracket part 51 includes a left pipe part mounting opening 512. The left pipe part mounting opening 512 is disposed on the top surface of the left bracket part 51. The left pipe part mounting opening 512 is a screw hole where a screw not shown in the figures is tightened. The pipe bracket 48 is mounted to the left bracket part 51 by screwing a screw into the left pipe part mounting opening 512. The right bracket part 52 includes a right pipe part mounting opening 522. The right pipe part mounting opening 522 is disposed on the top surface of the right bracket part 52. The right pipe part mounting opening 522 is a screw hole where a screw not shown in the figures is tightened. The pipe bracket 48 is mounted to the right bracket part 52 by screwing a screw into the right pipe part mounting opening 522.

The left bracket part 51 includes a left engine mounting opening 513. The left engine mounting opening 513 penetrates the left bracket part 51 in the longitudinal direction of the bulldozer 1. The left bracket part 51 is mounted to the front surface of the engine 5 with the bolt in the left engine mounting opening 513. The right bracket part 52 includes a right engine mounting opening 523. The right engine mounting opening 523 penetrates the right bracket part 52 in the longitudinal direction of the bulldozer 1. The right bracket part 52 is mounted to the front surface of the engine 5 with the bolt in the right engine mounting opening 523.

The connector 53 connects the left bracket part 51 and the right bracket part 52. The connector 53 has a shape with an indentation in the downwards direction. As shown in the front view of the bulldozer 1 in FIG. 4, the connector 53 is situated under the crank shaft 21. Additionally, in the front view of the bulldozer 1, the connector 53 is situated under the cam pulley 27. As shown in FIG. 2, the connector 53 includes a recess 531 extending in the widthwise direction of the bulldozer 1. The recess 531 extends upwards from the bottom surface of the connector 53.

The pipe bracket 48 is secured to the front mounting bracket 50. The pipe bracket 48 is disposed on the front mounting bracket 50. The pipe bracket 48 is situated forward of the front mounting part 31. As shown in FIG. 7, the pipe bracket 48 includes a left pipe bracket 54, the right pipe bracket 55 and the pipe bracket connector 56.

The left pipe bracket 54 includes a left base 541, the left support part 542, and the left wall part 543. The left support part 542 is installed to protrude upwards from the left base 541. The top surface of the left support part 542 has a shape that bends downwards. The main body pipe part 42 is disposed on the left support part 542. The left support part 542 supports the main body pipe part 42. There are openings 544 and 545 at the front and back of the left support part 542. The left wire stationary material 57 (refer to FIG. 5) passes through these openings 544 and 545. The left stationary material 57 is bent into the shape of the letter U. The left stationary material 57 is secured to the left support part 542 to affix the main body pipe part 42 to the left pipe bracket 54. The left wall part 543 extends upwards from the left base 541. The left wall part 543 has a plate shape. The left wall part 543 is situated behind the main body pipe part 42. The right pipe bracket 55 includes the right base 551, the right support part 552 and the right wall part 553. The right pipe bracket 55 has a near symmetrical shape with the left pipe bracket 54. Additionally, the right base 551, right support part 552 and right wall part 553 are nearly symmetrically shaped with the left base 541, the left support part 542, and the left wall part 543. There are openings 554 and 555 at the front and back of the right support part 552. The right wire stationary material 58 (refer to FIG. 5) passes through these openings 554 and 555. The right stationary material 58 is bent into the shape of the letter U. The right stationary material 58 is secured to the right support part 552 to affix the main body pipe part 42 to the right pipe bracket 55.

The pipe bracket connector 56 connects the left pipe bracket 54 and the right pipe bracket 55. To be more specific, the pipe bracket connector 56 connects the left base 541 and the right base 551. As shown in the front view of the bulldozer 1 in FIG. 4, the pipe bracket connector 56 is situated higher than the connector 53 of the front mounting bracket 50. In the front view of the bulldozer 1, the pipe bracket connector 56 is situated lower than the crank shaft 21. In the front view of the bulldozer 1, the pipe bracket connector 56 is situated lower than the bottom part of the main body pipe part 42. Also, at least a portion of the cam pulley 27 is visible in the front view of the bulldozer 1 between the pipe bracket connector 56 and the bottom part of the main body pipe part 42.

Next is a description of the front mounting part 31 and the rear mounting part 32. The front mounting part 31 is situated lower than the rear mounting part 32. As described earlier, the front mounting part 31 includes the left front mounting part 31L and the right front mounting part 31R. As shown in FIG. 5, the left front mounting part 31L includes a first left elastic part 61L. The right front mounting part 31R includes a first right elastic part 61R. The first left elastic part 61L and the right elastic part 61R are each formed of an elastic material such as rubber. The first left elastic part 61L and the right elastic part 61R each have a cylindrical shape. The front mounting bracket 50 supports the body frame 10 via the first left elastic part 61L and the first right elastic part 61R. Additionally, the engine 5 and the exhaust emission control device 41 are elastically supported by the body frame 10 by the front mounting part 31.

As shown in FIG. 2, the rear mounting part 32 is situated behind and above the front mounting part 31. The rear mounting part 32 is situated higher than the center of gravity G1 of the engine 5. The front mounting part 31 is situated lower than the center of gravity G1 of the engine 5. The center of gravity G1 of the engine 5 is closer to the front mounting part 32 than the front mounting part 31 in the longitudinal direction. At least a portion of the rear mounting part 32 is situated above the flywheel housing 6. The rear mounting part 32 is situated higher than the hydraulic pump 7. The rear mounting part 32 is positioned lower than the top surface of the cylinder head cover 26. The rear mounting part 32 is positioned below the cab 12. For the description of this embodiment, the center of each mounting part in the vertical direction is used as the standard for the vertical position of the front mounting part 31 and the rear mounting part 32. Alternatively, the position of the seat surface of each mounting part can be used as the standard.

Figure 8:
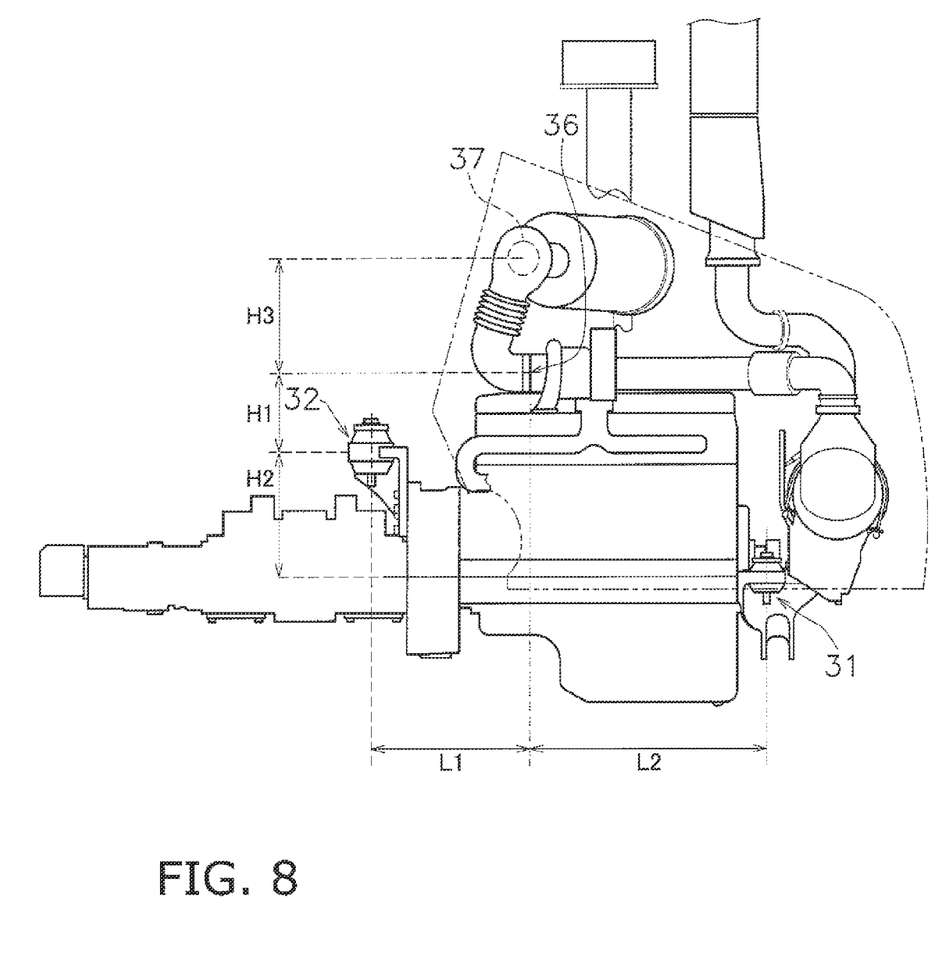
FIG. 8 is a side view showing the configuration inside the engine cover.

As shown in FIG. 8, the vertical height H1 between the rear mounting part 32 and the first connector 36 is less than the height H2 between the rear mounting part 32 and the front mounting part 31. For the vertical direction, the height H1 between the rear mounting part 32 and the first connector 36 is less than the height H3 between the first connector 36 and the second connector 37. For this embodiment, the center of each connector in the vertical direction is used as the standard for the vertical position of the first connector 36 and the second connector 37.

Figure 9:
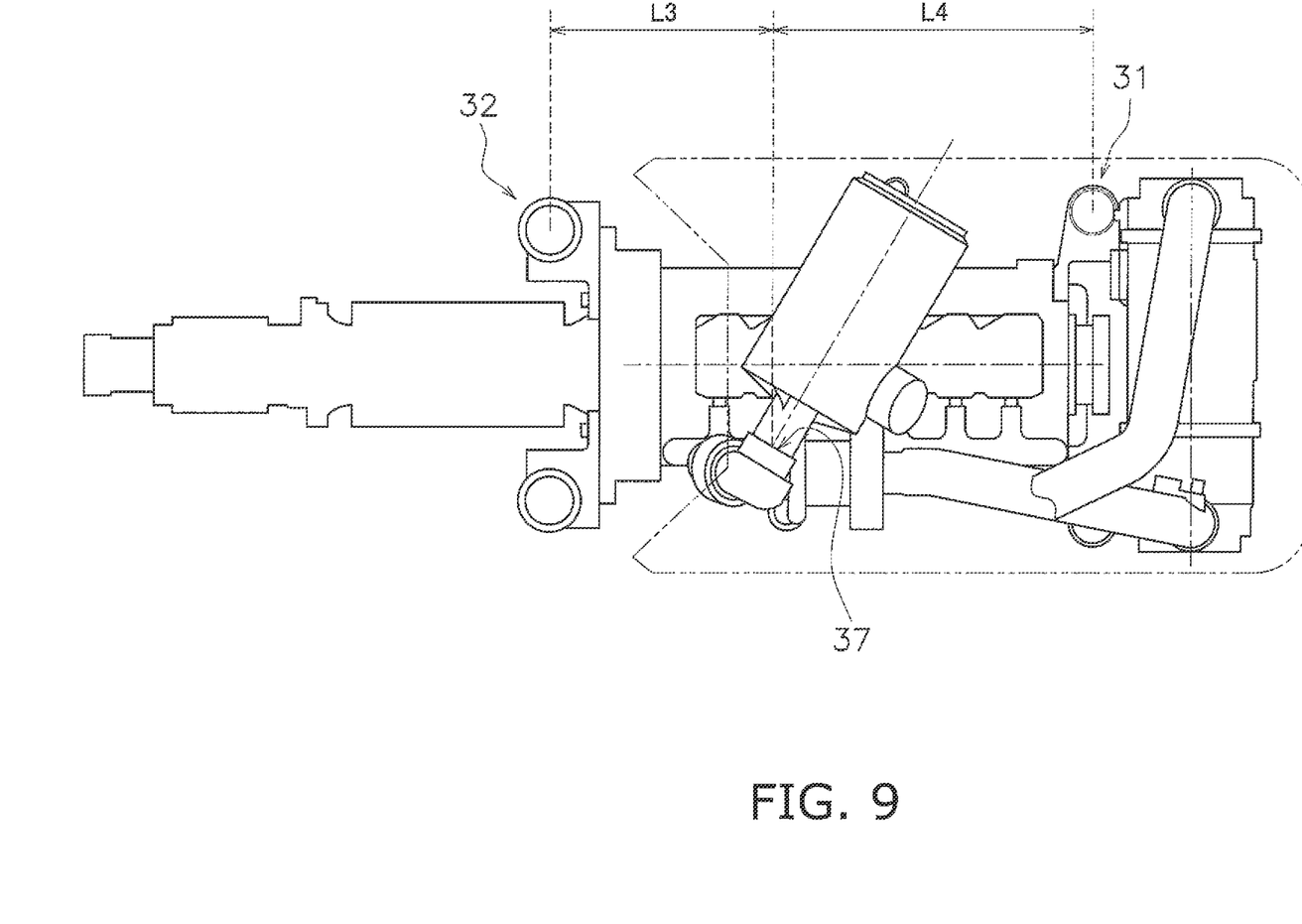
FIG. 9 is a plane view showing the configuration inside the engine cover.

In the longitudinal direction of the bulldozer 1, the length L1 between the first connector 36 and the rear mounting part 32 is less than the length L2 between the first connector 36 and the front mounting part 31. As shown in FIG. 9, in the longitudinal direction, the length L3 between the second connector 37 and the rear mounting part 32 is less than the length L4 between the second connector 37 and the front mounting part 31. For the description of this embodiment, the standard for the longitudinal direction position of the front mounting part 31 and the rear mounting part 32 is centered in the longitudinal direction of each connector. The standard for the longitudinal direction position of the first connector 36 and the second connector 37 is centered in the longitudinal direction of each connector As shown in FIG. 3, the rear mounting part 32 includes the left rear mounting part 32L and the right rear mounting part 32R. The left rear mounting part 32L and the right rear mounting part 32R are positioned separated each other in the widthwise direction of the bulldozer 1. The left rear mounting part 32L includes a second left elastic part 62L. The right rear mounting part 32R includes a second right elastic part 62R. The second left elastic part 62L and the second right elastic part 62R are each formed of an elastic material such as rubber. The second left elastic part 62L and the second right elastic part 62R each have a cylindrical shape. The diameters of the second left elastic part 62L and the second right elastic part 62R are both greater than the diameters of the first left elastic part 61L and the first right elastic part 61R. The engine 5 is elastically supported by the body frame 10 at the rear mounting part 32 with the second left elastic part 62L and the second right elastic part 62R.

As shown in FIG. 2, the rear mounting part 32 is mounted to the engine 5 with the rear mounting bracket 63. The rear mounting bracket 63 is mounted to the flywheel housing 6. The rear mounting bracket 63 extends upwards from the flywheel housing 6. To be more specific, as shown in FIG. 3, the rear mounting bracket 63 includes a left rear bracket part 63L and a right rear bracket part 63R. The left rear bracket part 63L and the right rear bracket part 63R are separated members. The left rear bracket part 63L and the right rear bracket part 63R are positioned apart from each other in the widthwise direction of the bulldozer 1. In the plane view of the bulldozer 1, the previously mentioned hydraulic pump 7 is situated between the left rear bracket part 63L and the right rear bracket part 63R. The left rear bracket part 63L and the right rear bracket part 63R are both mounted to the back surface of the flywheel housing 6.

The bulldozer 1 relating to this embodiment has the following features.

Since the rear mounting part 32 is situated above the front mounting part 31, the vertical distance between the duct 34 and the rear mounting part 32 is shorter than if the rear mounting part 32 is situated at the same height as the front mounting part 31. Therefore, the load on the duct 34 due to vibration can be reduced.

The rear mounting part 32 is positioned higher than the center of gravity G1 of the engine 5 so if the rear mounting part 32 is situated at a height less than the center of gravity G1 of the engine 5, the vertical distance between the duct 34 and the rear mounting part 32 is shorter. Therefore, the load on the duct 34 due to vibration can be reduced.

In the vertical direction, the height H1 between the rear mounting part 32 and the first connector 36 is less than the height H2 between the rear mounting part 32 and the front mounting part 31. In other words, the rear mounting part 32 is vertically situated in a position closer to the first connector 36 than the front mounting part 31. The vertical distance between the first connector 36 and the rear mounting part 32 is short. As a result, the load on the first connector 36 due to vibration can be reduced.

In the vertical direction, the height H1 between the rear mounting part 32 and the first connector 36 is less than the height H3 between the first connector 36 and the second connector 37. In other words, the first connector 36 is vertically situated in a position closer to the rear mounting part 32 than the second connector 37. The vertical distance between the first connector 36 and the rear mounting part 32 is short. As a result, the load on the first connector 36 due to vibration can be reduced.

In the longitudinal direction of the bulldozer 1, the length L1 between the first connector 36 and the rear mounting part 32 is less than the length L2 between the first connector 36 and the front mounting part 31. In other words, the first connector 36 is situated in a position in the longitudinal direction that is closer to the rear mounting part 32 than the front mounting part 31. In this case, vibration to the duct 34 is more strongly impacted by the position of the rear mounting part 32 than the position of the front mounting part 31. Therefore, since the vertical distance between the duct 34 and the rear mounting part 32 is short, the load on the duet 34 due to vibration can be effectively reduced.

In the longitudinal direction of the bulldozer 1, the length L3 between the second connector 37 and the rear mounting part 32 is less than the length L4 between the second connector 37 and the front mounting part 31. In other words, the second connector 37 is situated in a position in the longitudinal direction that is closer to the rear mounting part 32 than the front mounting part 31. In this case, vibration to the duct 34 is more strongly impacted by the position of the rear mounting part 32. Therefore, since the vertical distance between the duct 34 and the rear mounting part 32 is short, the load on the duct 34 due to vibration can be effectively reduced.

The diameters of the second left elastic part 62L and the second right elastic part 62R are both greater than the diameters of the first left elastic part 61L and the first right elastic part 61R. As a result, the vibration transmitted to the duct 34 from the rear part of the engine 5 can be effectively reduced.

The rear mounting bracket 63 is mounted to the flywheel housing 6. In particular, the rear mounting bracket 63 extends upwards from the flywheel housing 6. As a result, the rear mounting part 32 can be easily situated in a high position.

The hydraulic pump 7 is mounted to the flywheel housing 6 behind the flywheel housing 6 so there is a greater load on the rear mounting part 32 than the front mounting part 31. As indicated above, the diameters of the second left elastic part 62L and the second right elastic part 62R are both greater than the diameters of the first left elastic part 61L and the first right elastic part 61R so the vibration transmitted to the duct 34 can be effectively reduced, even if there is a tremendous load on the rear part of the engine.

The top surface of the engine cover 13 is inclined towards the front and downward. Therefore, visibility toward the front from the cab 12 improves. On the other hand, with the shape of this engine cover 13, the space at the top of the engine 5 in the engine cover 13 is narrowing towards the front. Therefore, it is preferred that the air cleaner 33 be situated towards the back above the engine 5. However, in this instance, there is a concern that there will be great vibration transmitted to the duct 34 from the rear part of the engine 5. As indicated above, the bulldozer 1 in this embodiment has a short vertical distance between the duct 34 and the rear mounting part 32 so the load on the duct 34 due to vibration can be reduced.

The above describes an embodiment of the present invention but the present invention is not limited to the aforementioned embodiment, and various modifications are possible without departing from the scope and the spirit of the invention.

In the abovementioned embodiment, the positioning of the front mounting part 31, the rear mounting part 32, the first connector 36 and the second connector 37 in designated areas are used as the standards but other areas can be used as the standards for designating positions for each of these parts.

The rear mounting part 32 is not limited to that higher than the center of gravity G1 of the engine 5, and can be situated at the same height as the center of gravity G1, or lower than the center of gravity G1. The vertical distance between the rear mounting part 32 and the first connector 36 may be equal to or greater than the distance between the rear mounting part 32 and the front mounting part 31. The vertical distance between the rear mounting part 32 and the first connector 36 may be equal to or greater than the distance between the first connector 36 and the second connector 37. However, it is preferred that there be a relationship for the distance of each part like that stated in the abovementioned embodiment to reduce the distance between the rear mounting part 32 and the duct 34.

The distance between the first connector 36 and the rear mounting part 32 in the longitudinal direction of the bulldozer 1 may be equal to or greater than the distance between the first connector 36 and the front mounting part 31. The distance between the second connector 37 and the rear mounting part 32 in the longitudinal direction of the bulldozer 1 may be equal to or greater than the distance between the second connector 37 and the front mounting part 31.

The diameters of the second left elastic part 62L and the second right elastic part 62R can be equal to or less than the diameters of the first left elastic part 61L and the first right elastic part 61R. However, it is preferred that the diameters of the second left elastic part 62L and the second right elastic part 62R be greater than the diameters of the first left elastic part 61L and the first right elastic part 61R, as found in the abovementioned embodiment, in order to efficiently reduce the vibration from the rear part of the engine 5.

The rear mounting bracket 63 can be mounted on a part other than the flywheel housing 6. For example, the rear mounting bracket 63 can be mounted on the body frame 10.

The invention claimed is:

1. A bulldozer comprising:
   a body frame;
   a cab situated on the body frame;
   an engine cover situated in front of the cab;
   an engine situated on the body frame inside the engine cover, and including a crank shaft extending in a longitudinal direction of the bulldozer;
   an air cleaner secured to the engine cover, and positioned above the engine;
   a duct connecting the air cleaner and the engine, and including
      a first connector connected to the engine, and
      a second connector connected to the air cleaner;
   a front mounting part supporting the engine on the body frame; and
   a rear mounting part situated behind and above the front mounting part, and supporting the engine on the body frame,
   the front mounting part including a first elastic part, and
   the rear mounting part including a second elastic part with a larger diameter than the first elastic part.

2. The bulldozer according to claim 1, further comprising:
   a mounting bracket for mounting the rear mounting part to the engine; and
   a flywheel housing situated behind the engine,
   wherein the mounting bracket is mounted on the flywheel housing.

3. The bulldozer according to claim 2, wherein
   the mounting bracket extends upwards from the flywheel housing.

4. The bulldozer according to claim 2, further comprising
   a hydraulic pump situated behind the flywheel housing, and mounted on the flywheel housing.

5. The bulldozer according to claim 1, wherein
   a top surface of the engine cover slopes downward towards a front of the bulldozer.

* * * * *